Dec. 18, 1923.
A. G. SUTCLIFFE
1,477,606
BRUSH RIGGING FOR ELECTRIC MOTORS AND GENERATORS
Filed Feb. 8, 1923
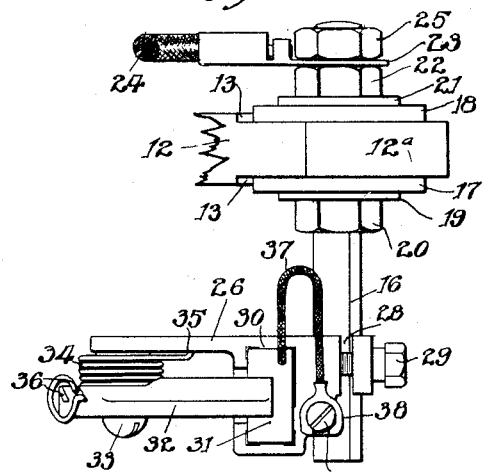
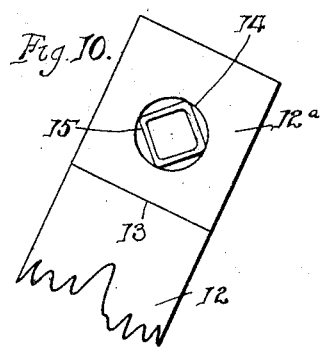
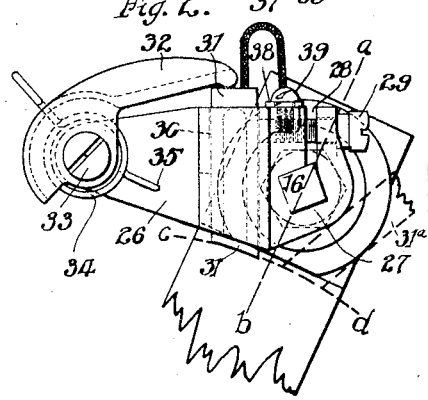
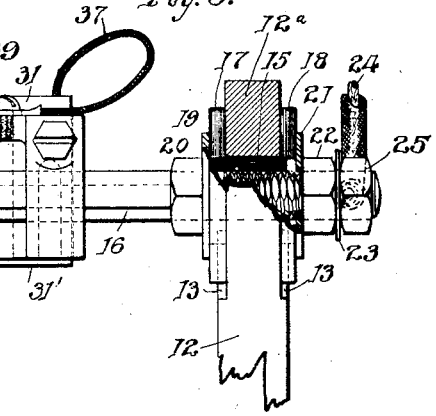
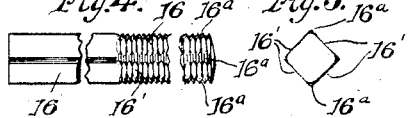
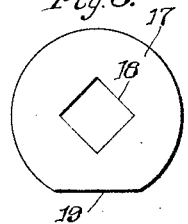
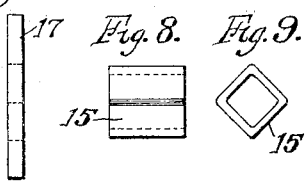
INVENTOR.
Arthur G. Sutcliffe,
BY Samuel N. Pond,
ATTORNEY.

Patented Dec. 18, 1923.

1,477,606

UNITED STATES PATENT OFFICE.

ARTHUR G. SUTCLIFFE, OF CHICAGO, ILLINOIS, ASSIGNOR TO ILG ELECTRIC VENTILATING COMPANY, OF CHICAGO, ILLINOIS, A CORPORATION OF LOUISIANA.

BRUSH RIGGING FOR ELECTRIC MOTORS AND GENERATORS.

Application filed February 8, 1923. Serial No. 617,884.

*To all whom it may concern:*

Be it known that I, ARTHUR G. SUTCLIFFE, a citizen of the United States, residing at Chicago, in the county of Cook and State of Illinois, have invented certain new and useful Improvements in Brush Rigging for Electric Motors and Generators, of which the following is a specification.

This invention relates to the general art of electric motors and generators, and has reference more particularly to an improved brush rigging for electrical machines of this character. The main objects of the invention are first, to provide an improved rigging which will hold the brush at the neutral point in a fixed and definite place on the commutator and prevent chattering and sparkling and, second, to provide an improved brush rigging of such a character that the brush holder can be readily removed from its supporting stud and its position on the latter reversed without changing the angle of the brush to a line radial of the axis of the commutator, thereby adapting the motor to run in a reverse direction with the same brushes, and accomplishing this without the usual trouble of re-grinding the contact ends of the brushes to make them accurately fit the commutator in the new brush position.

Other objects and attendant advantages of the invention will be apparent to persons familiar with devices of this character from the following detailed description, taken in connection with the accompanying drawing wherein I have illustrated one practical and approved embodiment of the invention, and in which—

Fig. 1 is a top plan view of my improved brush rigging;

Fig. 2 is an end elevation of the same, viewed from the bottom of Fig. 1;

Fig. 3 is a side elevation, partly in vertical section, viewed from the right of Fig. 2;

Fig. 4 is a detail side elevation, broken out, of the stud which carries the brush holder;

Fig. 5 is an end view of Fig. 4, viewed from the right of the latter;

Fig. 6 is a face elevation of one of the insulating washers through which the stud is clamped to and positioned in the rocker arm;

Fig. 7 is an edge elevation of Fig. 6;

Fig. 8 is a side elevation of an insulating bushing between the stud and rocker arm;

Fig. 9 is an end elevation of Fig. 8; and

Fig. 10 is a side elevation of the upper portion of the rocker arm.

Referring to the drawings, 12 designates the rocker arm, the upper portion 12ª of which is of slightly reduced thickness whereby there are formed on the opposite sides thereof transverse shoulders 13, for a purpose hereinafter disclosed. In the reduced upper end portion of the rocker arm is drilled a round transverse hole 14, in which is located a square bushing 15 (Figs. 8 and 9) made of insulating material, and preferably having its corners slightly rounded, as shown in Figs. 9 and 10, to fit the hole 14 in the rocker arm and afford a surface, rather than a mere line, bearing. This bushing 15 is slightly longer than the hole 14 in which it fits, so that the ends thereof project slightly on opposite sides of the latter, as clearly shown in Fig. 3.

16 designates the stud, which is of square cross section throughout its entire length; one portion thereof being threaded, leaving four flattened sides between the threaded corners which are continuous with the flat sides of the unthreaded portion; these flattened surfaces of the threaded portion being shown at 16' in Figs. 4 and 5 and the intermediate sections of the thread being shown at 16ª. The threaded section of the stud, which is substantially squared by the four flattened surfaces 16', as shown in Fig. 5, fits snugly in the bushing 15, projecting beyond the latter for some distance as shown in Fig. 3. The stud is securely clamped in the rocker arm against any possibility of accidental turning by means of a pair of washers 17 and 18 preferably of fibre or similar insulating material, these washers, one of which is shown in detail in Figs. 6 and 7, having square holes 18 that fit the projecting end portions of the bushing 15, and also a flattened edge portion 19 that lies in contact with the shoulder 13 of the rocker arm, whereby the washers, bushing and stud are locked against turning movement. The washer 17 is clamped against its adjacent side of the rocker arm by a thin metal washer 19 and a nut 20; and the companion washer 18 is similarly clamped against its adjacent side of the rocker arm by a thin metal washer 21 and a nut 22. On the projecting end of the stud is fitted the metal terminal clip 23 of a circuit wire 24, the same being clamped against the nut 22 by a binding nut 25 which also serves as a lock nut for the nut 22.

On the plain squared portion of the stud 16 is mounted the brush holder 26, this being a rigid arm formed with a square hole 27 fitting over the stud 16, a radial slot 28, and a clamping screw 29 for drawing together the parts between which the slot 28 is formed and thus securely binding the brush holder on the stud. The brush holder is cast or otherwise formed with a rectangular transverse slot 30 in which is slidably mounted the carbon brush 31, the lower end 31' of which is suitably beveled to a nice fit with the surface of the commutator. The brush is spring pressed into contact with the commutator by an arm 32 that is pivoted on a screw stud 33 mounted in the free end of the brush holder, and is urged downwardly by a torsion spring 34 anchored at one end to the brush holder as shown at 35 in Figs. 1 and 2 and at its other end adjustably anchored to the hub of the arm 32 through engagement with one of a series of slots 36 in the latter; the free end of the arm bearing on the top of the brush. A wire 37 imbedded at one end in the top of the brush 31 and at its other end connected to the brush holder by a terminal clip 38 and binding screw 39 constitutes an electrode between the brush and the brush holder.

By reference to Fig. 3 it will be observed that the bushing 15 does not extend entirely through the outer washer 18. The purpose of this is to permit a limited degree of compression of the washer, by which a more rigid and perfect clamping effect on the rocker arm is obtained.

By reason of the described manner and means of mounting the stud in the rocker arm, the latter is held against turning on its axis by the engagement of the flat portions of the washers 17 and 18 with the shoulders 13 of the rocker arm quite as securely as if the stud were fitted into a square hole in the rocker arm; and the necessity of drilling a square hole, which is a difficult and expensive operation, is avoided. The construction also holds the stud very rigidly against lateral vibration. Furthermore, the square hole 27 of the brush holder, fitting the square stud 16 and gripped on the latter by the clamp screw 29 makes possible the quick removal and reversal of the brush holders whenever the motor or generator is to run in the reverse direction. It will be further noted by reference to Fig. 3 that the polygonal stud 16 is mounted in the rocker arm in such a position that the brush 31 always lies at the same angle to and at a constant distance from, a radius of the commutator, indicated by the dotted line $a$—$b$ intersecting the axis of the stud in either of the two oppositely extending positions of the brush holder; the position of the brush when the brush holder is reversed being indicated by dotted lines at $31^a$, and an arc of the commutator with which the lower end of the brush is slidingly engaged being indicated by the dotted line $c$—$d$. Where the cross section of the stud is square, as herein shown, the radius $a$—$b$ also bisects opposite angles of the cross section of the stud in the stated position of the latter. This affords a considerable advantage in practical operation, since, for smoothness of operation and to avoid sparking, the lower end of the brush has a drag, and not a push engagement with the commutator, and this type of engagement is maintained, and at the same angle, when the brush holder is reversed to suit the reverse running of the motor or generator.

I claim—

1. In a brush rigging for electric motors and generators, the combination of a rocker arm having a round hole formed therethrough, an insulating bushing in said hole formed with a polygonal bore and projecting beyond a side of said rocker arm, a stud of corresponding polygonal cross-section fitted into said bushing and projecting beyond the ends of the latter, clamping means for securing said stud in said rocker arm including a washer non-rotatably mounted on said bushing, co-operating means on said rocker arm and washer preventing turning movement of the latter, and a brush holder mounted on said stud.

2. In a brush rigging for electric motors and generators, the combination of a rocker arm having a round hole formed therethrough, an insulating bushing in said hole of polygonal cross-section both externally and internally and projecting beyond both sides of said rocker arm, a stud of corresponding polygonal cross-section fitted into said bushing and projecting beyond the ends of the latter, clamping means for securing said stud in said rocker arm including a pair of washers fitted onto the projecting ends of said bushing and bearing against the opposite sides of said rocker arm respectively, co-operating means on said rocker arm and washers preventing turning movement of the latter, and a brush holder mounted on said stud.

3. In a brush rigging for electric motors and generators, the combination of a rocker arm having a transverse shoulder on a side thereof and a round hole formed therethrough above said shoulder, an insulating bushing in said hole formed with a polygonal bore and projecting beyond a side of said rocker arm, a stud of corresponding polygonal cross-section fitted into said bushing and projecting beyond the ends of the latter, clamping means for securing said stud in said rocker arm including a washer non-rotatably mounted on the projecting end of said bushing and formed with a flattened peripheral portion lying in contact with said shoulder, and a brush holder mounted on said stud.

4. In a brush rigging for electric motors and generators, the combination of a rocker arm having transverse shoulders on the opposite sides thereof respectively and a round hole formed therethrough above said shoulders, an insulating bushing in said hole of polygonal cross-section both externally and internally and projecting beyond both sides of said rocker arm, a stud of corresponding polygonal cross-section fitted into said bushing and projecting beyond the ends of the latter, clamping means for securing said stud in said rocker arm including a pair of washers fitted onto the projecting ends of said bushing and bearing against the opposite sides of said rocker arm respectively, said washers formed with flattened peripheral portions lying in contact with said shoulders, and a brush holder mounted on said stud.

5. In a brush rigging for electric motors and generators, the combination of a rocker arm having transverse shoulders on the opposite sides thereof respectively and a round hole formed therethrough above said shoulders, an insulating bushing in said hole of polygonal cross-section both externally and internally and projecting beyond both sides of said rocker arm, a stud having a threaded portion flattened to fit within said bushing and extending beyond the ends of the latter, a pair of washers fitted onto the projecting ends of said bushing and bearing against the opposite sides of said rocker arm respectively, said washers formed with flattened peripheral portions lying in contact with said shoulders, nuts on said stud serving to clamp said washers against the sides of said rocker arm, and a brush holder mounted on said stud.

6. In a brush rigging for electric motors and generators, the combination of a rocker arm, a stud of polygonal cross-section non-rotatably mounted in said rocker arm, a rigid brush holder formed with a polygonal opening fitting said stud, and a brush mounted in said brush holder; said stud being so positioned on said rocker arm that the brush will always lie at the same angle to, and at a constant distance from, a radius of the commutator intersecting the axis of said stud in either of two oppositely extending positions of said brush holder on said stud.

7. In a brush rigging for electric motors and generators, the combination of a rocker arm, a stud of square cross-section non-rotatably mounted in said rocker arm, a rigid brush holder arm formed with a square opening fitting said stud and equipped with means for clamping it on the latter, and a brush mounted in and transversely of said brush holder arm; said stud being so positioned on said rocker arm that opposite angles of its cross-section are bisected by a radius of the commutator passing through its axis, whereby said brush is always disposed at the same angle to, and at a constant distance from, said radius in either of two oppositely extending positions of said brush holder arm on said stud.

ARTHUR G. SUTCLIFFE.